(12) United States Patent
Choi et al.

(10) Patent No.: US 8,549,068 B2
(45) Date of Patent: Oct. 1, 2013

(54) APPARATUS AND METHOD FOR DISPLAYING SERVICE INFORMATION CORRESPONDING TO SERVICE ZONE

(75) Inventors: Dukho Choi, Seoul (KR); Jinsung Im, Seoul (KR); Yunji Koh, Seoul (KR); Kangsoo Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 54 days.

(21) Appl. No.: 13/146,870

(22) PCT Filed: Aug. 27, 2010

(86) PCT No.: PCT/KR2010/005798
§ 371 (c)(1),
(2), (4) Date: Jul. 28, 2011

(87) PCT Pub. No.: WO2012/026642
PCT Pub. Date: Mar. 1, 2012

(65) Prior Publication Data
US 2012/0054269 A1    Mar. 1, 2012

(51) Int. Cl.
*G06F 15/16* (2006.01)
*G06F 3/048* (2013.01)
*H04W 24/00* (2009.01)

(52) U.S. Cl.
USPC ........... 709/203; 709/218; 709/219; 709/249; 455/456.1; 455/456.3; 455/517; 455/422.1; 715/825

(58) Field of Classification Search
USPC ................. 709/201, 202, 203, 217–219, 229; 455/456.1, 456.3, 517; 715/825
See application file for complete search history.

(56) References Cited

U.S. PATENT DOCUMENTS

| | | | |
|---|---|---|---|
| 7,024,205 B1 * | 4/2006 | Hose | 455/456.1 |
| 2001/0042125 A1 * | 11/2001 | Watanabe et al. | 709/227 |
| 2004/0192339 A1 * | 9/2004 | Wilson et al. | 455/456.1 |
| 2004/0267943 A1 | 12/2004 | Ryu | |
| 2005/0027591 A9 * | 2/2005 | Gailey et al. | 705/14 |
| 2007/0123243 A1 * | 5/2007 | Suito | 455/419 |
| 2007/0233514 A1 * | 10/2007 | Kido et al. | 705/1 |
| 2008/0254762 A1 * | 10/2008 | Igval | 455/404.1 |
| 2009/0204986 A1 * | 8/2009 | Lee et al. | 725/27 |
| 2010/0114938 A1 * | 5/2010 | Weng | 707/769 |
| 2010/0267424 A1 * | 10/2010 | Kim et al. | 455/566 |
| 2012/0007716 A1 * | 1/2012 | Lee et al. | 340/10.4 |
| 2012/0058775 A1 * | 3/2012 | Dupray et al. | 455/456.1 |
| 2012/0179678 A1 * | 7/2012 | Irie et al. | 707/736 |

FOREIGN PATENT DOCUMENTS

| | | | |
|---|---|---|---|
| KR | 10-2005-0000976 A | 1/2005 | |
| KR | 10-2005-0095230 A | 9/2005 | |
| KR | 10-0654260 B1 | 11/2006 | |
| KR | 10-2009-0127469 A | 12/2009 | |

* cited by examiner

*Primary Examiner* — Joseph Avellino
*Assistant Examiner* — Aftab Nasir Khan
(74) *Attorney, Agent, or Firm* — Birch, Stewart, Kolasch & Birch, LLP

(57) ABSTRACT

A terminal includes: a wireless communication unit configured to receive service information; a controller configured to provide control to perform re-searching or display a menu for searching for service information after the terminal enters a service zone; and a display unit configured to visually display service information under the control of the controller.

11 Claims, 7 Drawing Sheets

APPARATUS AND METHOD FOR DISPLAYING SERVICE INFORMATION CORRESPONDING TO SERVICE ZONE

TECHNICAL FIELD

The present invention relates to an apparatus and method for displaying service information and, more particularly, to an apparatus and method for displaying service information corresponding to a service zone.

1. Background Art

In general, when using a service provided in a particular area, a user searches for a desired service among numerous services provided in the area and proceeds to use such service. In particular, even when the user has frequently used the service of the corresponding area or even when the user has frequently visited the corresponding area, the user must directly search for desired service information among the numerous service information provided in the corresponding area.

2. Disclosure of the Invention

Therefore, an object of the present invention is to extract customized service information from service information corresponding to a service zone and display the same.

To achieve these and other advantages and in accordance with the purpose of the present invention, as embodied and broadly described herein, there is provided a terminal including: a wireless communication unit configured to receive service information; a controller configured to provide control to re-search the received service information or display a menu for searching the received service information in a service zone; and a display unit configured to visually display service information under the control of the controller.

The service information may be provided the service zone, wherein the service information is at least one of a service, a service list, or contents with respect to a service.

The service zone may be an area to receive service information from a server in a network established in a certain place or area.

The controller may provide control tore-search the received service information when input information for re-searching is received.

The controller may control the display unit to display changed service information when the re-searching is completed, wherein the changed service information is distinguished from the service information before performing the re-searching.

The controller may provide control to display notification information indicating that the re-searching is currently being performed.

The notification information may be at least any one of a visual signal, an audible signal, and a tactile signal.

The controller may control the display unit to receive service information by using a location-based service when there is no service information on completing the re-searching.

The controller may provide control to display information for guiding to receive service information through a reader when there is no service information on completing the re-searching.

The guiding information may be information including at least one of the location of the reader and information indicating a command for accessing the reader.

The reader may measure a signal strength of a terminal located nearby and perform communication with the terminal.

The controller may provide control to display a menu for searching service information when the number of the received service information is greater than a pre-set threshold value.

The menu may include one or more of sub-menus for inputting text or setting a service category.

The controller may provide control to extract service information corresponding to the information input to the menu and display the extracted service information.

To achieve these and other advantages and in accordance with the purpose of the present invention, as embodied and broadly described herein, there is also provided a server including: a storage unit configured to store service information corresponding to a service zone; an information extraction unit configured to extract service information corresponding to request information among the stored service information, wherein the request information is transmitted from a terminal; and a transmission unit configured to transmit the extracted service information to the terminal, wherein the request information is information input to a menu for searching service information of the terminal.

The service zone may be an area to receive service information from a server in a network established in a certain place or area.

The service information may be provided the service zone, the service information is at least one of a service, a service list, or contents with respect to a service.

The menu may include one or more of sub-menus for inputting text or setting a service category.

According to exemplary embodiments of the present invention, customized service information is extracted from among service information corresponding to the service zone, thus increasing a user convenience.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODES FOR CARRYING OUT THE PREFERRED EMBODIMENTS

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

The mobile terminal described in the present invention may include mobile phones, smart phones, notebook computers, digital broadcast receivers, PDAs (Personal Digital Assistants), PMPs (Portable Multimedia Player), navigation devices, and the like. It would be understood by a person in the art that the configuration according to the embodiments of the present invention can be also applicable to the fixed types of terminals such as digital TVs, desk top computers, or the like, except for any elements especially configured for a mobile purpose.

Figure 1:
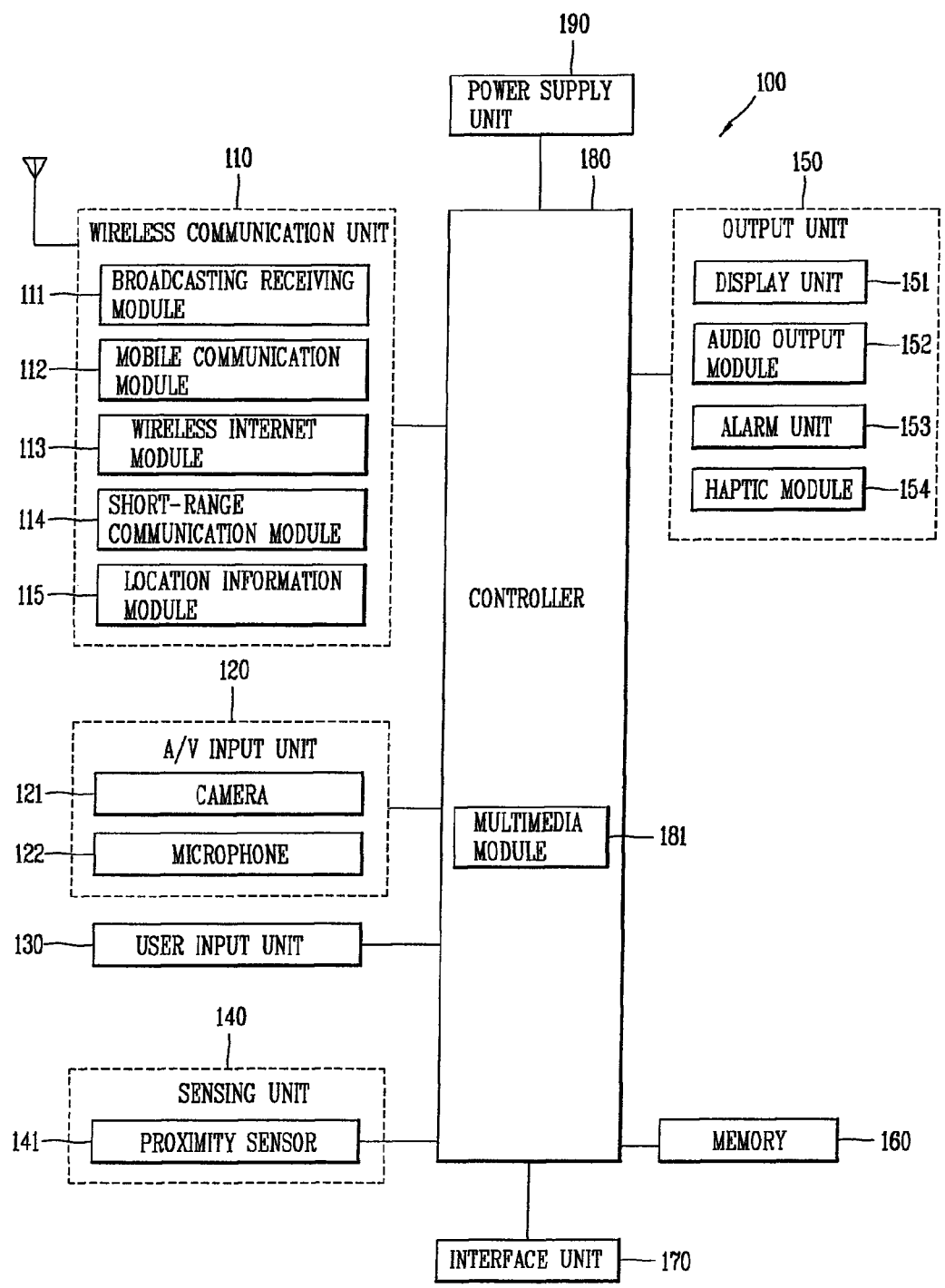
FIG. 1 is a schematic block diagram of a mobile terminal according to an exemplary embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

With reference to FIG. 1, the A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Exemplary embodiments of the present invention related to a control method that can be implemented in the terminal configured as described above will now be described in detail. The exemplary embodiments described hereinafter may be used alone or may be combined to be used. The exemplary embodiments described hereinafter may be combined with the foregoing user interface so as to be used.

Concept of Zone Casting Service

First, a zone casting service refers to a service in which when a user who has entered a service zone executes a zone casting application (an application program), service information corresponding to the service zone is transmitted from a server. In particular, the zone casting service refers to a service of providing customized service information among the service information corresponding to the service zone. Here, the customized service information refers to tailored service information which is useful to or required by the user in a current service zone.

The service zone refers to an area in which the terminal can receive a service provided from a server within a network, the network is established in a particular place or particular area. For example, the particular place or particular area may be a department store, a theater, a hotel, and the like, or a particular area including the department store, the theater, and the hotel.

Here, a wired/wireless communication scheme may be used to be connected to the network. Also, short-range wireless communication scheme such as Wi-Fi, Bluetooth, NFC/RFID, or the like, may be employed as the wireless communication scheme, but the present invention is not limited thereto and a mobile communication scheme such as 3G, LTE, WiMAX, or the like, may be also employed.

The service information refers to information, such as a service, a service list, contents with respect to the corresponding service, and the like, which can be provided in the service zone. Here, the service corresponding to the service zone may be represented or expressed in various manners such as icons, images, text, and the like.

The zone casting application refers to an application program for receiving the zone casting service, which can be available in any place of the service zone. Namely, the zone casting application refers to an application available in the service zone in which the zone casting service is provided. Also, the zone casting application may be previously stored in a terminal or may be downloaded automatically or manually when a terminal enters the service zone. Here, the discrimination of automatic and manual operation means that the application program can be used without a user intervention.

System for Providing Zone Casting Service

Figure 2:
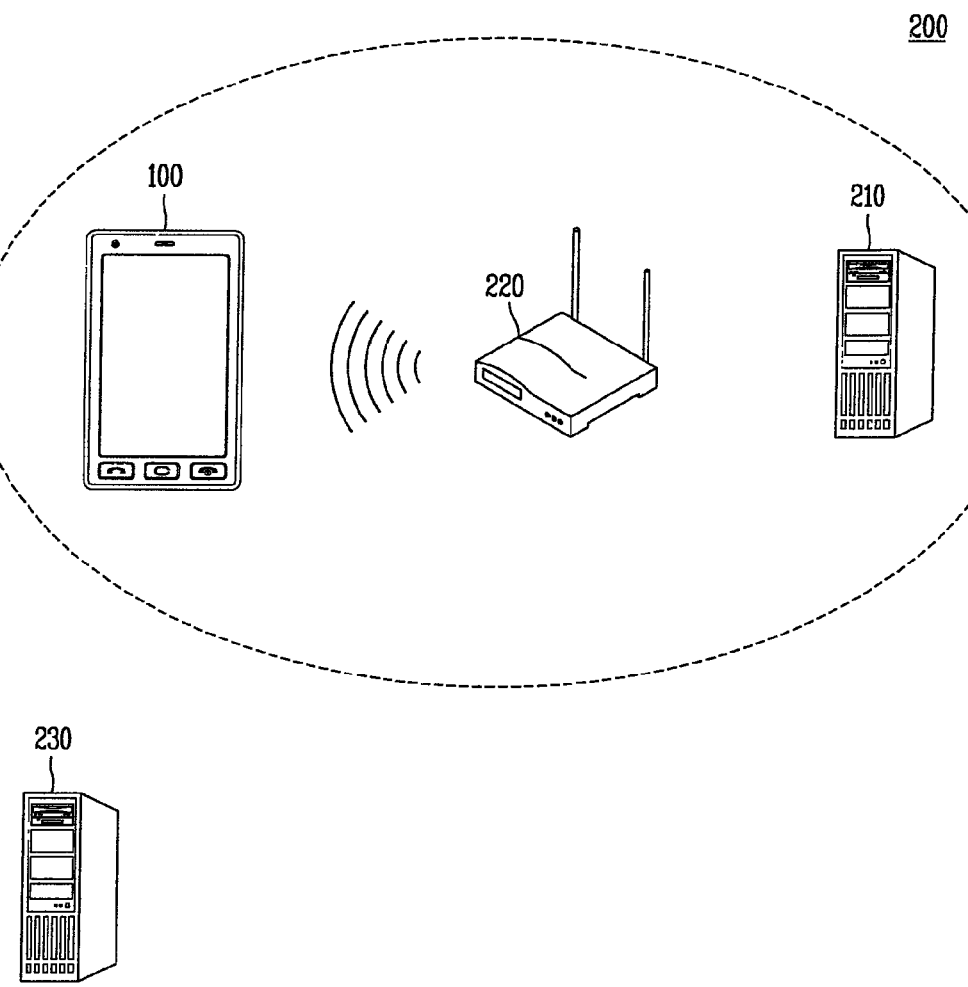
FIG. 2 is a conceptual view of a zone casting service according to an exemplary embodiment of the present invention.

FIG. 2 is a conceptual view of providing a zone casting service according to an exemplary embodiment of the present invention.

A system 200 for providing a zone casting service may be configured to include a terminal 100, and a server, and an access point 220.

First, when the terminal 100 enters a service zone, the terminal may inform whether or not the service zone provides a zone casting service by using any one of a visual, audible, and tactile signal. For example, the terminal may inform whether or not the service zone provides a zone casting service by using text, an image, an icon, vibration, a voice, and the like.

When user's request information for using the zone casting service is input, access points (APs) corresponding to the service zone are searched, and the terminal is connected to a server within the service zone through one of the searched APs. After being connected to the server, the terminal receives the service information stored in the server. Here, the server is a part of a network established in the service zone, and the connection to the server is used to have the same meaning as a connection to the network. Thus, hereinafter, a connection to the server is interpreted to have the same meaning as a connection to the network.

Here, the user's request information input refers to a case in which a zone casting application is executed. The user's request information input may be made in various manners such as selecting a zone casting application displayed on a screen, a terminal's movement, and the like.

The server includes a local server 210 within the service zone and an external server 230 outside the service zone.

The local server 210 is a server installed within the service zone, which stores service information corresponding to the service zone. Also, the local server provides the stored service information to the terminal connected thereto.

The local server 210 stores the service information corresponding to the service zone as database in various forms such as according to service types, service providing places, and the like. Here, the information DB stored in the local server 210 correspond to service information provided in the place or a particular area including the local server, namely, in the service zone.

For example, when the service zone is a hotel, the local server stores service information provided in the hotel, namely, various service information, such as information regarding an area around the hole, information regarding a room service, information regarding a restaurant provided in the hotel, and the like, as database.

The external server 230 refers to a server which stores location information regarding a service zone provided by the zone casting service, as database. The external server is generally located outside the service zone which the terminal has currently entered, but it may be also located within the service zone.

Here, when the terminal is located outside the service zone, it may be provided with information regarding the location of the service zone, in which the zone casting service is provided, which is nearest to the current location of the terminal from the external server. Namely, the terminal transmits its location information measured by the GPS receiver to the external server, and receives location information of the service zone, providing the zone casting service, which is located nearby from the external server.

In this case, the terminal is connected to the external server by using various communication schemes such as short-range communication, mobile communication, and the like.

The AP 220 is a wireless communication device for a connection to the local server 210. In this case, the AP 220 uses independent power and includes a module available for short-range communication. Also, location information of the area in which the AP 220 is installed is stored in the local server. In the present exemplary embodiment, the case in which the terminal is connected to the local server by using Wi-Fi radio access scheme is taken as an example, but the present invention is not limited thereto and can be applicable to the short-range communication such as NFC/RFID, ZigBee, Bluetooth, and the like.

Also, the zone casting service system includes a reader.

The reader is installed in the service zone and stores service information corresponding to the service zone. The stored service information may be every service information corresponding to the service zone or may be service information corresponding to a particular area in the service zone. For example, when the service zone is a hotel, the reader may be installed in the hotel and store every service information provided in the hotel or may store only service information corresponding to a particular floor in the hotel.

Also, the reader performs communication with terminals in the service zone by using short-range communications such as RFID communication, Wi-Fi communication, or the like. Here, in order to perform short-range communication with the terminal, the reader includes a short-range communication module.

For example, a method for receiving service information through a reader having a Wi-Fi module will now be described. First, the reader searches nearby devices having a Wi-Fi module. The reader measures a signal strength of the searched devices and performs communication with devices having a signal strength higher than a threshold value.

Here, the threshold value may be a value fixed as a signal strength value sufficient for communication with the reader or may be a value which can be varied. Thus, service information corresponding to the service zone is transmitted or received through the communications.

The reader uses a TCP/IP protocol and includes an encryption module for transmitting and receiving service information including security or authentication among service information. Thus, the user may use service information such as a user authentication, payment, or the like, through the

Embodiment of Zone Casting Service

First Embodiment

Figure 3:
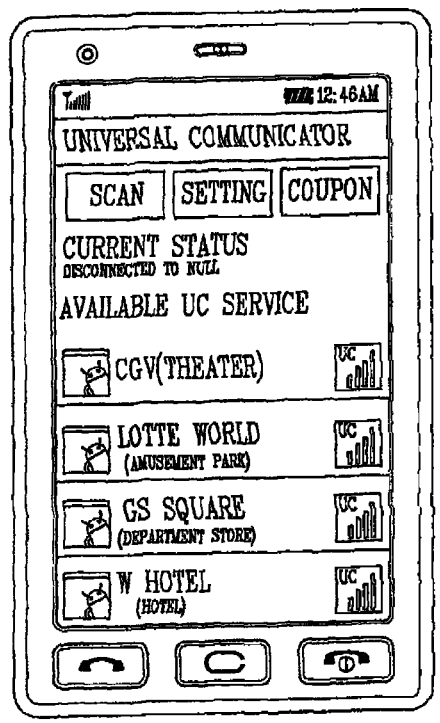
FIG. 3 is overviews of display screens illustrating the function of displaying service information corresponding to a service zone according to an exemplary embodiment of the present invention.

FIG. 3 is overviews of display screens illustrating the function of displaying service information corresponding to a service zone according to an exemplary embodiment of the present invention.

First, when the terminal enters a service zone, it is connected to a server in the service zone and receives service information corresponding to the service zone through a wireless communication unit.

When information requesting security or user authentication is set in the service information corresponding to the service zone, a controller of the terminal may check whether or not the terminal has the authority to access the service information, namely, whether or not the terminal has the authority to use the service information, and provides control to display the service information.

Namely, the controller of the terminal checks whether or not the terminal has the authority to access the service information by comparing information stored in the terminal and the service information. Here, the stored information may be a stored phone number, user name, authentication certificate, or the like.

Upon comparison, in case of service information which the terminal does not have the authority to access, the controller of the terminal may provide control to display service information other than the service information which the terminal does not have authority to access, or may provide control to display service information along with information indicating that there is no authority to access. The information indicating that there is no authority to access may be any one of visual, audible, and tactile signals.

When there is no authority to access the service information, the controller of the terminal may provide control to display guide information regarding the authority to access. For example, in the case of service information which the terminal will have the authority to access only when the number of frequency of use is greater than a certain number of times, the current number of times and a remaining number of use for accessing the service information may be displayed. Also, in case of service information set for security, for which, thus, authentication is requested, a pop-up window for an authentication may be displayed or information indicating that authentication can be made through a reader in the service zone.

Also, upon comparison, in case of service information which the terminal has the authority to access, namely, has the authority to use, the controller of the terminal may provide control to display the level of the user with respect to the access authority, the degree of the use of service information according to the level, or the like.

Also, upon comparison, in case of service information which the terminal has the authority to access, when an additional user authentication is required, the controller of the terminal may provide control to display information for performing user authentication. Here, methods for the user authentication may be, for example, displaying a screen image for user authentication. The user authentication may be performed through various methods, such as through a voice recognition, an eyeball recognition, a fingerprint recognition, through a reader, or through a direct input by the user through a certificate.

Here, the user authentication may be performed through the reader. In this case, the reader may be installed within the service zone or may be installed in particular places or particular areas of the service zone. Here, the reader measures a signal strength of terminals located nearby. In particular, the reader may measure a signal strength of terminals having a Wi-Fi module. The reader may detect terminals having a signal strength greater than a certain value and communicate with the terminals. The certain value may be fixed as a value set in the reader or may be changed.

Second Embodiment

The controller may search for a current situation of the user, a surrounding situation, and status information of service information, extract service information corresponding to the search results among service information corresponding to the service zone, and provide control to display the extracted service information.

Here, the current situation information of the user may be a user's body temperature, an emotional state of the user, and the like. The user's body temperature is measured through a temperature sensor provided in the terminal. Thus, service information corresponding to the temperature measured by the temperature sensor is extracted and displayed.

Also, the surrounding situation information may be the distribution, a use status, or the like, of the users within the service zone. In this case, the distribution of the users may be measured through a signal strength, the number of access points located nearby, and the like. Also, the surrounding situation information may be received from the server within the service zone.

Also, the state information of the service information may be information regarding the quality, a data capacity, security, or authentication of the service information corresponding to the service zone, may be information regarding whether or not the service information corresponding to the service zone has been infected with virus, or may be information regarding whether or not the service information corresponding to the service zone has an error. Here, the quality of the service information may vary according to a user class. Namely, the user class is determined according to the credibility of the user, the number of use of the service information, whether or not the user has joined the service, and the like.

Also, the data capacity may be measured through time required for receiving the service information. Thus, the controller searches for state information of the service information among the service information corresponding to the service zone, extracts service information based on the search results, and provides control to display the extracted service information.

Also, the controller may compare the service information corresponding to the service zone with service information stored in the storage unit, extract the same or similar service information, and provide control to display the extracted service information.

For example, the controller may extract service information corresponding to schedule information stored in the storage unit or extract service information corresponding to information currently displayed on the screen or having the same category as that of the information, and provide control to display the extracted information.

Third Embodiment (Method for Displaying Service Information After Re-searching)

Figure 4:
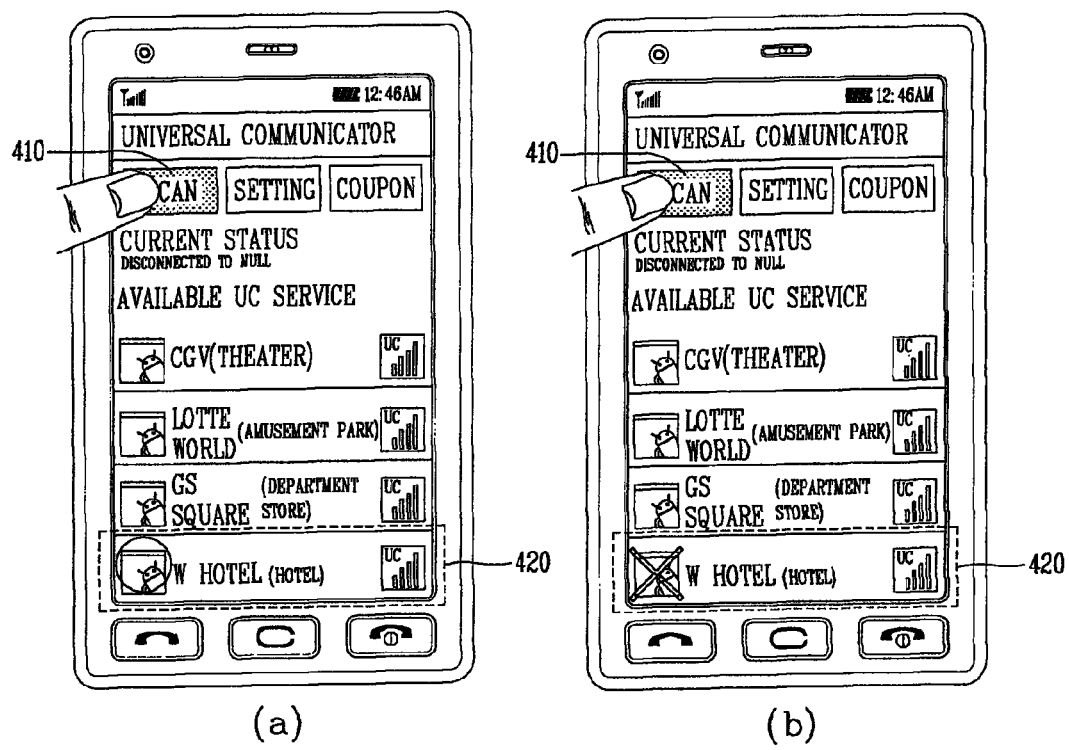
FIG. 4 is overviews of display screens illustrating the function of displaying service information when a re-search request is input by a user after a terminal enters a service zone according to an exemplary embodiment of the present invention.

FIG. 4 is overviews of display screens illustrating the function of displaying service information when a re-search request is input by a user after a terminal enters a service zone according to an exemplary embodiment of the present invention.

When input information with respect to a re-search request is received from the user (410), the controller provides control to perform re-searching the service information received from a service zone. Namely, when there is no service information desired by the user or when service information is not displayed because of a current, poor communication state of the service zone, the controller provides control to perform re-searching in order to receive again service information corresponding to the service zone. Here, the input information with respect to the re-search request may be generated by any one of a re-search button, voice, a movement of the terminal, time, schedule information, and a communication situation in the service zone.

When the re-search button displayed on the display unit is selected by the user, re-searching is performed. Also, a voice signal may be received and re-searching may be performed based on the voice signal. Also, re-searching may be performed based on the movement of the terminal measured by any one of a gyro sensor, an acceleration sensor, a gravity sensor, and a geomagnetic sensor.

Also, re-searching may be performed based on time received through a GPS receiver or a base station. In this case, re-searching may be performed at a pre-set time or at certain time intervals. Also, re-searching may be performed based on schedule information stored in the terminal. Here, the schedule information may be information regarding any one among a schedule time, a place, and content, but the present invention is not limited thereto.

The controller may provide control to display newly added or deleted service information such that it is discriminated or differentiated from existing service information according to the re-search results (420). Namely, after the re-searching is performed, the controller displays a changed matter to be discriminated from service information before re-searching is performed. Here, the controller may provide control to adjust the size of newly added or deleted service information to display the same or may provide control to display text or an image indicating the newly added or deleted service information. Alternatively, the controller may provide control to display the newly added or deleted service information and the existing service information as a main screen and a peripheral screen, or vice versa.

Also, the controller may provide control to display a state of service information which cannot be used according to a current situation of the service zone.

Figure 5:
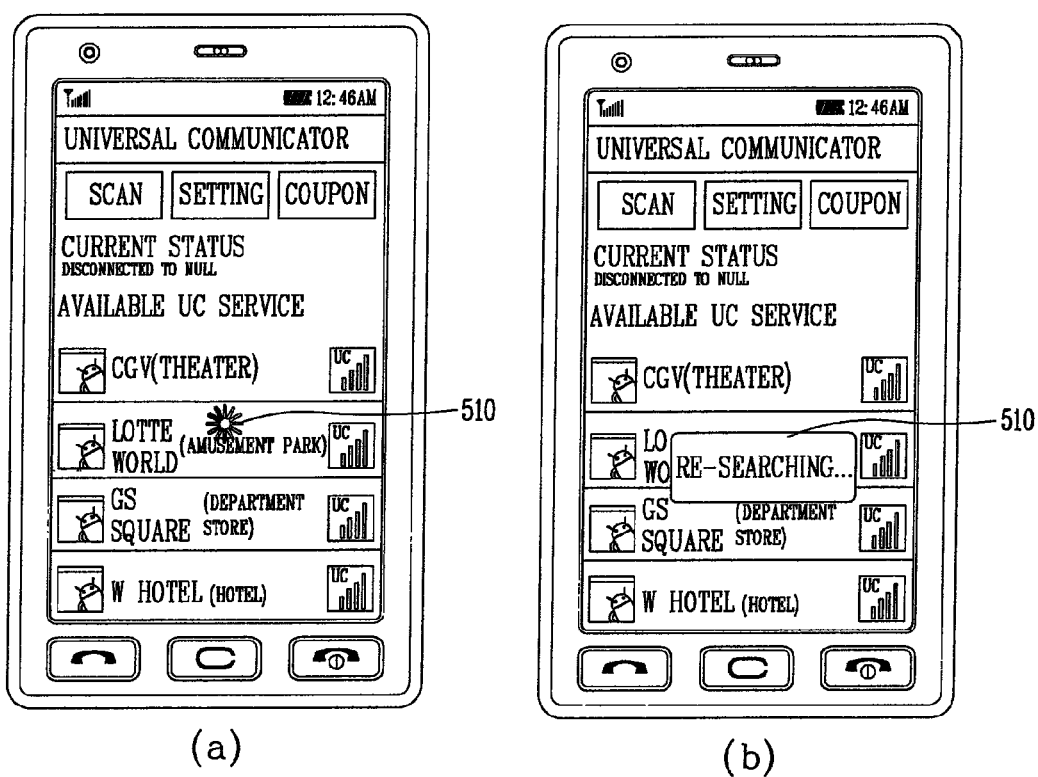
FIG. 5 is overviews of display screens illustrating a situation in which re-searching is performed according to an exemplary embodiment of the present invention.

FIG. 5 is overviews of display screens illustrating a situation in which re-searching is performed according to an exemplary embodiment of the present invention.

When re-searching is performed, the controller may provide control to display notification information indicating that re-searching is performed (510). Here, the notification information may be any one of visual, audible, and tactile signals. For example, text, an image, a voice, or the like, may correspond to the notification information.

Also, the controller may provide control to continue the notification information until before the re-searching is finished. In this case, the controller may provide control to adjust the size of displayed letters, the size of a voice tone, or the like, to indicate the degree of proceeding of the re-searching.

Figure 6:
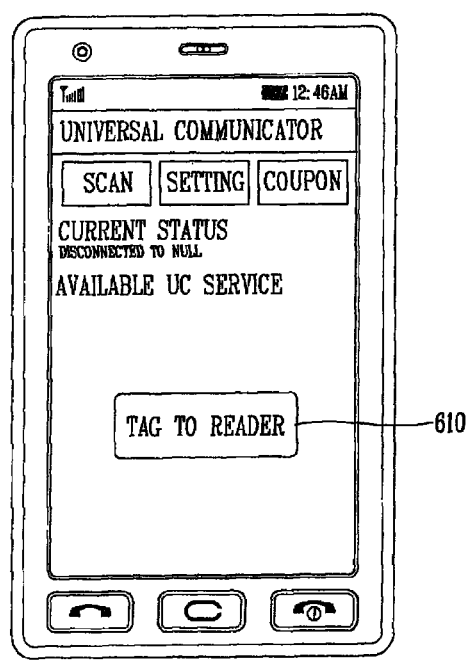
FIG. 6 is an overview of a display screen illustrating a situation in which service information is not displayed according to re-search performing results according to an exemplary embodiment of the present invention.

FIG. 6 is an overview of a display screen illustrating a situation in which service information is not displayed according to re-search performing results according to an exemplary embodiment of the present invention.

According to the re-search results, when there is no service information available, the controller extracts map information stored in the terminal. After extracting the map information, the controller may provide control to display the position of available service information on the extracted map information. The map information may include various types of information such as a position, a distance, a direction, an identification code, an image, or the like, of the service information corresponding to the service zone.

Also, when there is no service information available according to the re-search results, the controller may provide control to receive service information by using a location-based service (LBS). Here, the location-based service may be a GPS-based or a mobile communication network-based service. Namely, according to the re-search results, when there is no service information available, the controller may provide control to display a Web browser screen to receive service information through a mobile communication service.

Also, when there is no service information available according to the re-search results, the controller may provide control to display information for providing a guide to receive service information through the reader (610).

Here, the controller may provide control to display the guiding information through a message pop-up, a voice message, or the like.

The guiding information may include one or more of information regarding the location of the reader and information indicating a command for accessing the reader. Here, the reader may be installed within the service zone or may be installed in particular places or particular areas of the service zone. Here, the reader measures a signal strength of terminals located nearby. In particular, the reader may measure a signal strength of terminals having a Wi-Fi module. The reader may detect terminals having a signal strength greater than a certain value and communicate with the terminals. The certain value may be fixed as a value set in the reader or may be changed.

Fourth Embodiment (Method for Displaying Service Information Using Search Menu)

Figure 7:
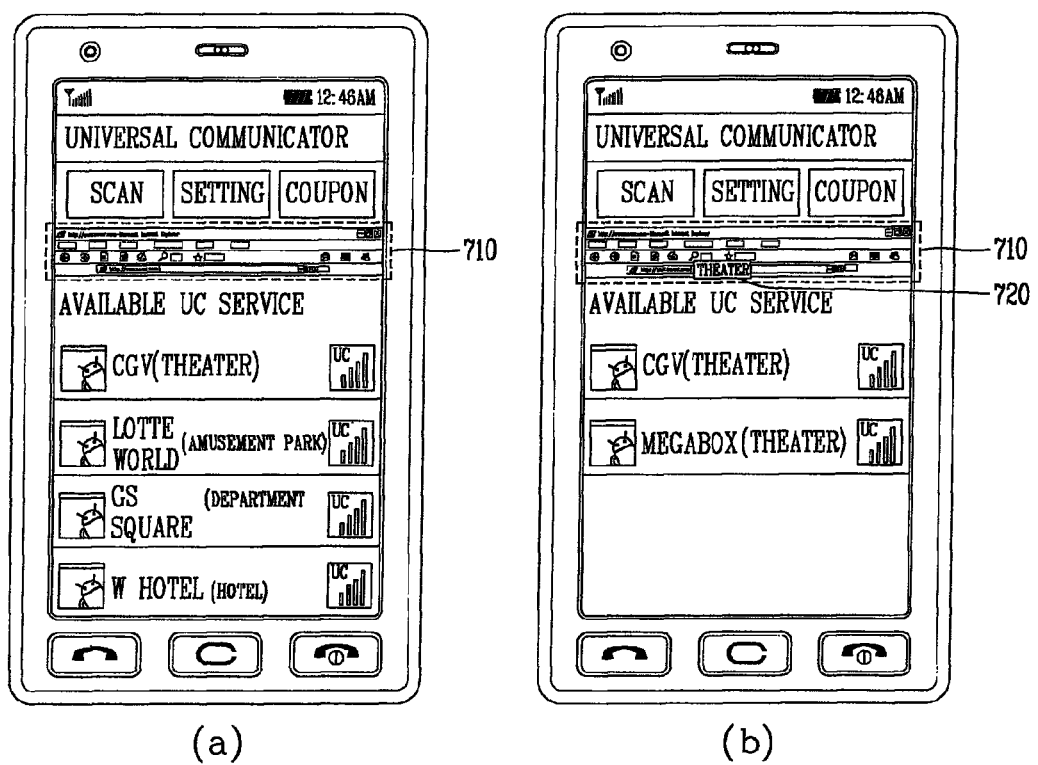
FIG. 7 is overviews of display screens illustrating the function of displaying a menu for searching for service information after the terminal enters the service zone according to an exemplary embodiment of the present invention.

FIG. 7 is overviews of display screens illustrating the function of displaying a menu for searching for service information after the terminal enters the service zone according to an exemplary embodiment of the present invention.

When the terminal enters the service zone, the controller provide control to display menus, namely, a search window, for searching for service information (710). When the number of the service information received from the service zone is greater than a pre-set threshold value, the controller provides control to display the menus. The pre-set threshold value may be set by the user or may be set according to the corresponding to the service zone. Namely, when the received service information is greater than a pre-set threshold value, the controller provides control to display menus for searching for service information.

Also, the menus may include various sub-menus such as a sub-menu for inputting text, a sub-menu for setting the category of each service, and the like.

Thus, the controller may extract service information corresponding to information input to the menu and provide control to display the extracted service information.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A mobile terminal comprising: a terminal body;
a wireless communication unit;
a display unit;
an audio output module;
a haptic module; and
a controller operatively coupled with the terminal body, the wireless communication unit, the display unit, the audio output module and the haptic module, the controller configured to: control at least one of the display unit, the audio output module and the haptic module for outputting an enter information related to a service zone when the terminal body enters the service zone;
receive, via the wireless communication unit, service information corresponding to the service zone from a server in a network established near the service zone;
display the service information on the display unit;
receive a re-search request for re-searching the service information corresponding to the service zone;
control the wireless communication unit to receive the re-searched service information from the server; and
control the display unit to display the re-searched service information,
wherein if the re-searched service information includes newly added or deleted information than the service information, the newly added or deleted information is displayed visually differently than information included in the service information,
wherein the controller controls the display unit to display a menu for searching service information when the number of the received service information is greater than a pre-set threshold value, and
wherein the re-search request is received based on at least one of a voice command received through a microphone of the mobile terminal, a touch input applied to the display unit, time, a movement of the mobile terminal, and schedule information stored in a memory of the mobile terminal.

2. The mobile terminal of claim 1, wherein the service information is provided the service zone, the service information is at least one of a service, a service list, or contents with respect to a service.

3. The mobile terminal of claim 1, wherein the controller controls the wireless communication unit to receive service information by using a location-based service when there is no service information on completing the re-searching.

4. The mobile terminal of claim 1, wherein the controller is further configured to execute an application for providing a zone casting service, and
wherein the service information corresponding to the service zone is received after the application is executed.

5. The mobile terminal of claim 1, wherein the controller controls the display unit to display notification information indicating that the re-searching is currently being performed.

6. The mobile terminal of claim 5, wherein the notification information is at least any one of a visual signal, an audible signal and a tactile signal.

7. The mobile terminal of claim 1, wherein the controller controls the display unit to display information for guiding to receive service information through a reader when there is no service information on completing the re-searching.

8. The mobile terminal of claim 7, wherein the guiding information is information including at least one of the location of the reader and information indicating a command for accessing the reader.

9. The mobile terminal of claim 7, wherein a signal strength of the mobile terminal is measured by the reader located near the mobile terminal, and the controller controls the wireless communication unit to perform communication with the reader.

10. The mobile terminal of claim 1, wherein the schedule information is related to at least one of a schedule time, a place and a particular content.

11. The mobile terminal of claim 10, wherein the controller controls the display unit to display the re-searched service information when the re-searching is completed, and
wherein the re-searched service information is distinguished from the service information before receiving the re-searched service information.

* * * * *